May 27, 1952     R. D. McCOY     2,597,886
DEMODULATING CIRCUITS

Filed Nov. 2, 1945     2 SHEETS—SHEET 1

INVENTOR
RAWLEY D. McCOY
BY
ATTORNEY

Patented May 27, 1952

2,597,886

UNITED STATES PATENT OFFICE 2,597,886

DEMODULATING CIRCUITS

Rawley D. McCoy, Bronxville, N. Y., assignor to The Sperry Corporation, a corporation of Delaware Application November 2, 1945, Serial No. 626,375

3 Claims. (Cl. 250—27)

The present invention relates, generally, to demodulating circuits or apparatus, and, more particularly, to circuits adapted to produce a direct voltage output signal proportional in amplitude to a pulse or alternating voltage input signal and having a polarity in accordance with the phase or polarity of the input signal relative to a reference signal.

An object of my invention is to provide phase sensitive demodulators which are not adversely affected by voltage supply fluctuations.

Another object of this invention is to provide demodulator circuits with a minimum ripple in the D. C. output.

Another object of this invention is to provide phase responsive or demodulating circuits which overcome previous excessive delay in signal response.

Another object of my invention is to provide demodulating circuits which are responsive linearly over wide ranges of amplitude.

Another object of my invention is to provide a circuit which can maintain its own balance over a long period of time.

Another object of my invention is to provide a circuit of the demodulator class which will permit the determination of range and location of signal echo detected objects in a radio pulse system.

A further object of my invention is to provide a demodulating or phase responsive circuit in which the intensity of a compared voltage in a servo system is measured by determining in terms of a D. C. output the phase difference between the compared voltage and the reference voltage.

A further object is to provide circuits for the vectorial combination of alternating electrical input signals without interaction between the inputs or reaction from a load.

A still further object of the invention is to provide improved apparatus and instrumentalities embodying novel features and principles, adapted for use in realizing the above objects and also adapted for use in other fields.

The invention in another of its aspects relates to novel features of the instrumentalities described herein for achieving the principal objects of the invention and to novel principles employed in those instrumentalities, whether or not these features and principles are used for the said principal objects or in the said field.

A feature of my invention is the provision of novel circuit arrangements for measuring by a change in its D. C. output either the phase displacement between reference voltages and input voltages indicating the polarity of the input voltages, and the strength of the compared signals in a situation such as a servo motor setup, or the signal intensity of a high frequency echo signal such as is obtained from a radio pulse system.

A further feature of this invention is the provision of improved phase comparing systems in which improved balance and decrease in delay are obtained by using noninductive loads.

Still another feature of the invention is the provision of a noninductive load in the D. C. output circuit of the subject apparatus Generally speaking, this invention comprises a plurality of cascaded electrical discharge devices such as triodes operating as keyed diodes so arranged with resistance condenser circuits that input signals may be applied to the anodes of the discharge devices through the condensers of the resistance-condenser circuits, the grids of the devices being made responsive to substantially any type of signal called reference signals, wherein, for the purposes and conveniences to be described hereinafter, they are so organized with respect to the input circuit that the devices are made conducting dependent primarily upon the existence of the input signals. Also, secondarily, the direct current output polarity of the devices is determined by phase displacement between the input and reference signals, the output strength being substantially proportional to the input signal amplitude and the output circuit being responsive to input changes with a minimum time lag by having the resistance-condenser circuit resistances in series with a direct current load.

In one basic arrangement the input signals are applied in like phase or time to the anodes of the discharge devices while a reference signal is impressed upon the control grid of one device in opposite phase or polarity to the reference signal supplied to the corresponding electrode of the other discharge device. An alternate arrangement contemplates supplying the input signal in phase opposition while the reference signal is applied in similar phase to both grids. In other words, in the first arrangement the anodes are effectively connected in parallel and the grids are connected so that they are oppositely polarized, while in the latter case an opposite setup exists wherein the anodes are now oppositely polarized and the anodes are of the same polarity. The invention outlined above is not limited to any type of alternating current rectification inherent in the circuits used as one can readily understand from a study of this application.

This complete circuit is called a demodulating circuit and can be used in many applications, as, for example, in servo systems and radio pulse systems. In the first example, sine wave signals may be applied to both the anodes and grids of the discharge devices, the anodes receiving the input or compared signals, while the grids are responsive to the reference signals. In the second example, pulse voltage signals of the high frequency type, for example, are impressed on the anodes while square, saw tooth or other types of waves derived from generators supplying keying and/or gating voltages are fed to the grids of these discharge devices.

In carrying out this invention in one of its preferred forms, a pair of input transformers are utilized. These transformers are energized by alternating voltage signals, called input compared signals, and by reference input signals, respectively. One of the transformers, that energized by the compared signals, has a center-tapped secondary winding and has a pair of electric discharge devices, such as triodes, connected in series across its secondary winding with like electrodes connected together and with a condenser interposed between said end of the transformer and the discharge device. A connection is made between the junction of the joined devices and the center-tapped winding. The reference signal transformer is connected to the junction of the devices and to control elements which are connected together so that both have identical polarities with signal changes. A resistive load is connected in shunt with the electrodes of each device, respectively and the loads are connected in series to provide a zero current lag D. C. output circuit. In case full-wave rectification is desired as a necessary adjunct to the invention it can be attained by substantially duplicating the above system with the respective output circuits connected in series. Also, generally speaking, the described circuit is susceptible for use in a radio pulsing system where the compared signals are replaced by high frequency signal pulses and the reference signals now appear as square wave keying and/or gating voltages or other characterized signals properly timed with the transmitted signal pulses.

A better understanding of the invention will be afforded by the following detailed description considered in connection with the accompanying drawings, and those features of the invention which are believed to be novel and patentable will be pointed out in the claims appended thereto.

In the drawings.

Like reference characters are utilized throughout the drawings to designate like parts.

Figure 1:
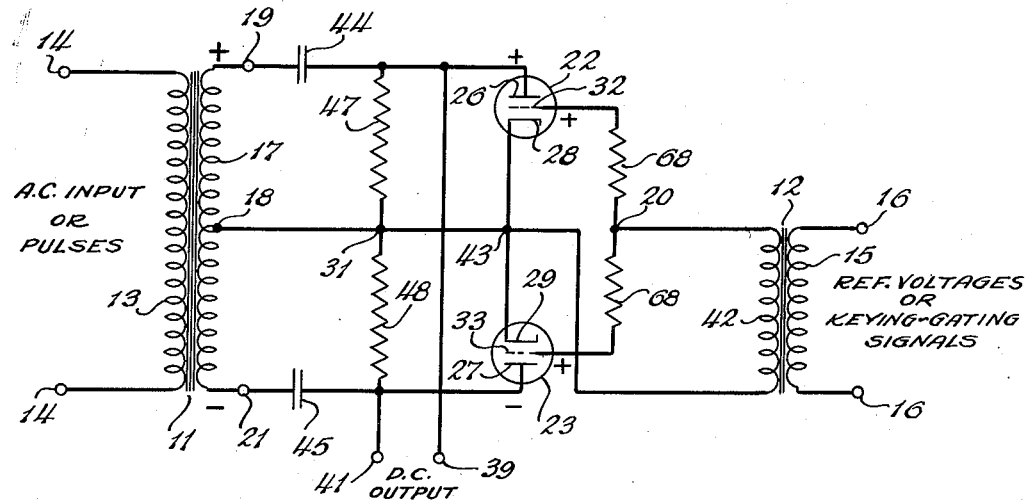
Fig. 1 is a circuit diagram of one embodiment of my invention wherein half-wave rectification is possible as a necessary adjunct to the invention.

In the apparatus illustrated in Fig. 1 there is a pair of input transformers 11 and 12. The transformers 11 and 12 have primary windings 13 and 15, respectively, connected to a pair of input terminals 14 and 16, respectively. One pair of input terminals, for example, the pair of terminals 16, is adapted to be connected to a source of reference voltages, and the other pair of input terminals, in this case the pair of terminals 14, is adapted to be connected to a source of signal voltages which are to be compared in phase with the reference voltages. It will be understood that the reference voltages will have the anticipated frequency of the signal voltages.

The transformer 11 has two secondary windings in series or a single secondary winding 17 with an intermediate tap, preferably a center tap 18 and end terminals 19 and 21. A pair of current-controlling devices 22 and 23, of the type having voltage-responsive control elements, is connected in series opposition across the secondary winding 17.

The current-controlling devices 22 and 23 may take the form of electric discharge devices, such as triode vacuum tubes, for example, or may constitute units of a twin triode vacuum tube having a common envelope.

Devices 22 and 23 comprise anodes 26 and 27 connected to one side of condensers 44 and 45, respectively, the other side of each condenser being connected to transformer end terminals 19 and 21, respectively, cathodes 28 and 29 connected together to a junction terminal 43, and control elements or grids 32 and 33. It will be observed that the current-controlling devices 22 and 23 are connected in push-pull, or, in series opposing relation, that is, the cathodes are connected together.

The secondary side 42 of the transformer 12 is connected to the grids 32 and 33 joined at junction 20 and to the junction 43 of the cathodes. A connection is also made between junction 43 and the center tap 18 of the transformer 11.

For the sake of illustration it may be assumed that the polarities of the voltage applied to the secondary 42 of transformer 12 is as shown at a particular instant. It is seen that both grids 32 and 33 are positive. At this same instant the A. C. signal input to transformer 11 is such that the polarities of the secondary are as shown, and a definite potential value will be associated with same. Each condenser 44, 45 will charge up in a well-known manner. Since plate 26 of triode tube 22 is made positive as an assumption, input signals will flow through condenser 44 and triode 22, charging this condenser to near the peak voltage of the signals. During this same time triode 23 is rendered inoperative because its plate is at a negative potential. During the following half-cycle of the input signal the polarities of the voltages on the respective plates of the triodes will be reversed. Also since the reference voltage is in phase with the input signal the voltage on the joined grids will change in polarity. Hence, it can be seen that neither tube will conduct because the grids are negative. While this no conducting state exists for both tubes, condenser 44 will discharge through resistor 47. The result of this is that the potential at 39 will be negative to ground and proportional to the signals or pulses from the input terminals 14. Hence, it is observed that when the input voltages and the reference voltages are in phase, tube 23 never is in a state of conducting current.

When the input or compared voltage is reversed in polarity, rectified half-wave signals will flow through tube 23 only and since condenser 45 will discharge through resistance 48 similarly as condenser 44 did through resistance 47, the polarity of output terminal 41 will be negative to ground making terminal 39 positive which is just the reverse of the first condition with all the voltages in phase. Hence, it is recognized that a change in the polarity of the D. C. output represents a 180° out-of-phase condition between the reference voltage and that compared with it. Since the input voltage to be compared can be made high enough for a plate supply on the respective tubes to effectively vary the plate current, the drop across each resistance will be dependent on input voltage variations. This will be seen in the intensity of the D. C. output.

In case of phase lag or phase lead between the definite voltages considered, current will flow for a portion of a cycle through the triode 22 and for the remaining portion of the cycle through triode 23. Consequently, the potential difference between the terminals 39 and 41 will be less than for phase coincidence of reference voltages and compared voltages, and a balanced current condition will take place with zero output potential difference when these distinct voltages are in phase quadrature.

Figure 2:
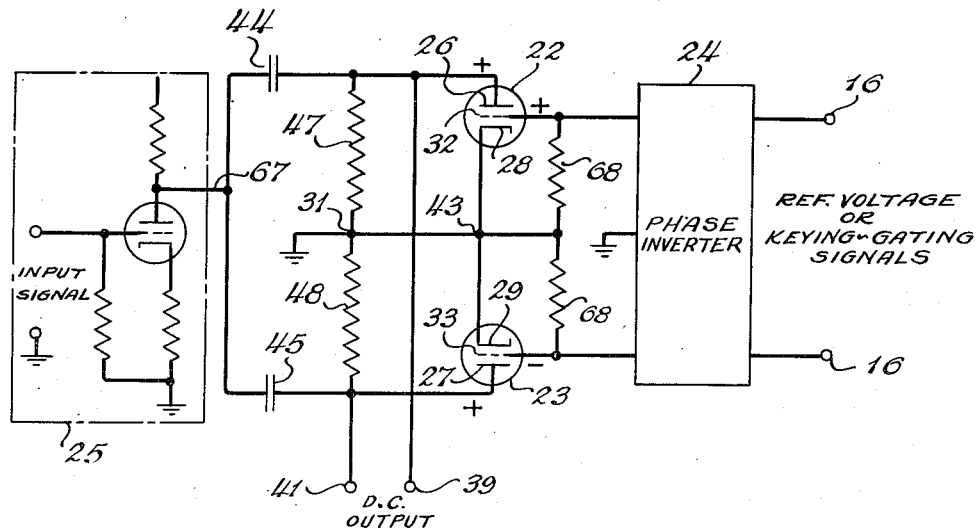
Fig. 2 is a circuit diagram of another embodiment of my invention wherein the use of transformers is eliminated.

If it is desired to avoid the use of transformers, the circuit of Fig. 2 can be employed. This is accomplished by substituting a detector amplifier circuit 25 in place of the input or reference voltage transformer 11 of the Fig. 1 circuit and by using a well-known phase inverter 24 for the immediate source of reference voltages applied to the control elements of the current controlling devices 22 and 23.

The detector amplifier circuit may be designated as circuit 25. The component parts of the same are conventional and therefore need not be discussed. It is sufficient to say that the grid of an electron discharge tube in the circuit 25 is charged with the input signals to vary its output. This output is fed to the condensers 44 and 45 over a common connection 67 thereby charging these condensers simultaneously. Since each condenser is also attached to the plates 26 and 27, respectively, of the devices 22 and 23, both plates will have the same polarity at any instant. This condition is the reverse of that for the circuit of Fig. 1. This necessitates the use of a phase inverter 24 because reference signals or voltages must appear at the control elements 32 and 33 with opposite polarities. To demonstrate the operation of the circuit it is recognized that instantaneous signal values must be used. Therefore, it is assumed that at a particular instant of time, the compared or input signal appearing at plates 26 and 27 has a positive polarity. The two reference signals derived from the phase inverter 24 are, for example 180° out of phase. Control element 32 is energized by a voltage having a positive polarity while the other control element 33 is negative in polarity. Under these conditions one versed in the art can see that device 22 will permit the flow of half-wave rectified current therethrough. Conversely, device 23 will not permit a current flow externally because the grid 33 is energized too far negatively with respect to the cathode 29 so as to be beyond a characteristic cutoff value. From this point on the development of the operation of the circuit is similar to Fig. 1 already explained.

For protecting the triodes 22 and 23 grid-current limiting resistors 68 are preferably provided. These serve also to make the output of the circuit substantially independent of variations in peak amplitude of the reference voltage applied to the phase inverter 24. The polarity and amplitude of the output voltage at the terminals 39 and 41 will then depend upon the phase and amplitude respectively of the signal voltage applied to the input of the circuit 25.

While the circuits of Figs. 1 and 2 have been described for use with a sine wave application such as a servo system, it can be seen that the fundamental elements of the novel circuit could as well be applied to many other applications, one by way of example being a radio pulse system. Pulse signals would then be fed into transformer 11, which is coupled to the plates of the triodes 22 and 23 by capacitors 44 and 45. These capacitors would now have different values than obtained for the previous application. It may be even necessary to avoid the use of transformers if sufficiently well designed and constructed transformers for this application are unattainable. In this case, electrical discharge tubes could be employed in place of the transformers. The resultant circuit would look somewhat like the circuit of Fig. 2 with such changes as coupling the electric valve of the input signal circuit 25 to the novel demodulator as a cathode follower and changing the circuit constants.

Keying and/or gating voltages of the square, saw tooth or any other wave form would be impressed on the control grids of the discharge devices 22 and 23 of the demodulator in time relationship with the transmitted pulses of the radio pulse system. The purpose of this circuit built around the novel demodulator or phase responsive apparatus fully described above is to obtain two D. C. potentials proportional to the magnitude of the components of a modulated high frequency input signal. The components of the input signal may be left-right, or up-down signals obtained from the two antennas of the mentioned radio system. Since in all probability, the concept of the circuit in Fig. 2 would be the one that would be followed for the radio system, further immediate description of the same will be limited thereto. For a particular radio application in mind, the input signals consist of 9-microsecond pulses with a repetition rate of 4098 per second and a keying frequency of 1200 cycles per second is used. A 1200 cycles per second square wave voltage, obtained from a point where original modulation was introduced, is applied to the grids of tubes 22 and 23 to make first one and then the other operative at the time that the pulses arriving at the input circuit 25 represent first right and then left error in the radio pulse system. Further discussion of this radio application would in all its principal essentials be a repetition of what has already been written relative to the novel demodulating circuits. Therefore, it is considered that pertinent information has been delineated for the purpose of demonstrating the wide use to which my invention is applicable.

A revealing feature of my invention is that the discharge devices in the phase responsive or demodulating circuits will not conduct current when the input signal is zero because of the fact that the signal is impressed on the plates of the discharge devices. This novel arrangement minimizes ripple voltage in the D. C. output, allows wider variations in the reference or keying voltages without serious results, and permits continuous circuit operation with little or no unbalance. In a particular instance a maximum unbalance of $\frac{1}{10}$ volt was recognized with a zero signal condition on the plates of the demodulator tubes. In another sense the novel demodulating circuits have the elements of a peak voltmeter and as such it has very little time delay due somewhat to the right selection of the R. C. circuit constants.

Figure 3:
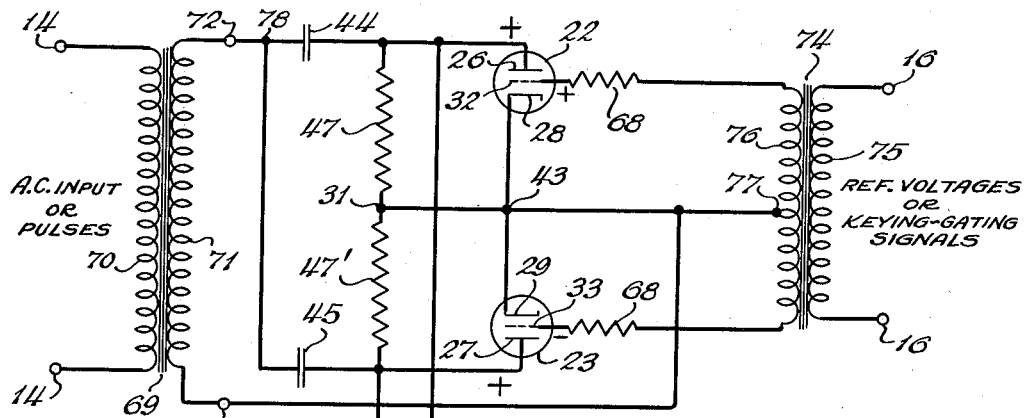
Fig. 3 is a circuit diagram of a modification of the arrangement of Fig. 1 avoiding the use of a center-tapped transformer on the power consuming side of the circuit.

Reverting to the first example of a typical embodiment of the invention, it is desired to point out that there may be instances in which a center-tapped transformer on the power consuming side of the circuit shown in Fig. 1 is to be avoided. However, if this is indulged in, the transformer used on the reference signals or voltage side feeding the control elements will have to be of the center-tapped type so that split phasing of the reference input voltage is produced. A development of this idea will further show that one pair of electrodes in the current control devices must have like polarities at any instant in order to produce an operable circuit. Therefore, the latter condition calls for a circuit such as shown in Fig. 3 in which condensers 44 and 45 still in series with the plates 26 and 27 of the current controlling devices 22 and 23 respectively are fed over connecters from the same terminal 78 near end terminal 72 on the secondary side 71 of the compared signal transformer 69 having a primary side marked 70. The other end terminal 73 of the secondary side 71 is connected to the center-tap 77 of the secondary side 76 of transformer 74 having the primary 75. Since the devices 22 and 23 are connected in series opposition, cathode junction 43 is joined to the center-tap 77. Thus, it is seen that whenever the plates 26 and 27 are positive, the cathodes respectively will be negative relative thereto. For the instant of operation designated by the polarity markings in the circuit, device 22 will permit current conduction since both the plate and grid are properly polarized. Device 23 is not discharging because its control element 33 is biased too far negatively. The organization of elements in the output end of this circuit is the same as found in Figs. 1 and 2 and therefore further expansion on the operation of the whole circuit would follow the same general plan as covered already for Fig. 1.

Figure 4:
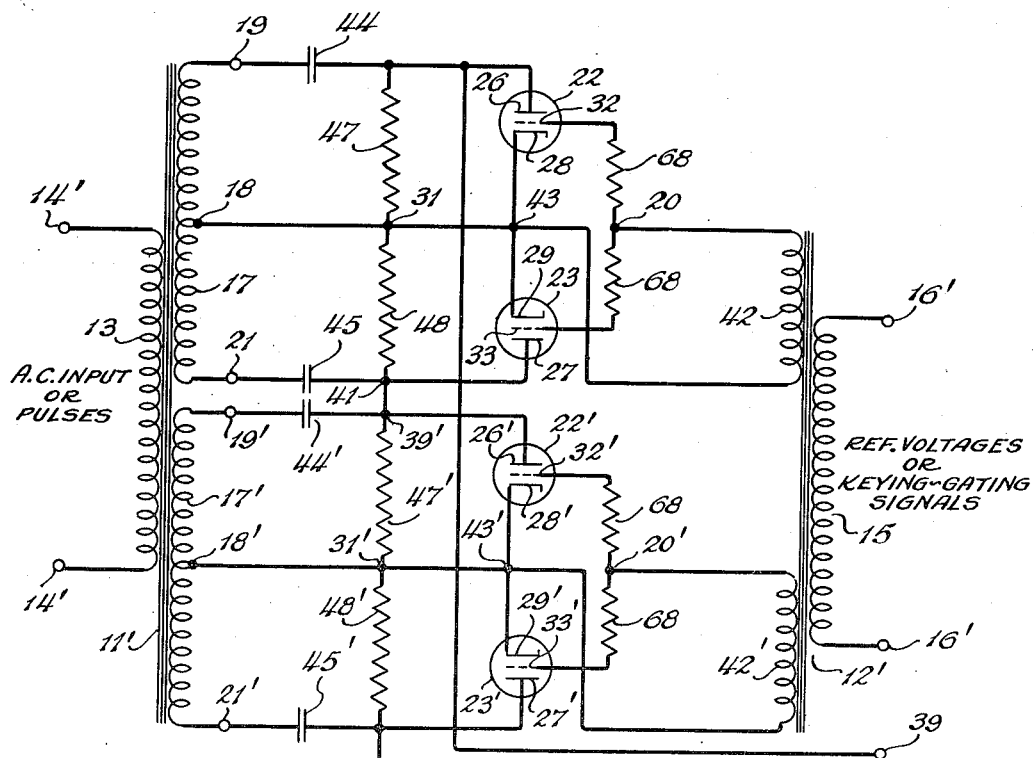
Fig. 4 is a circuit diagram of another embodiment of my invention wherein full-wave rectification is attained as one of the functions of the circuit.

Up to this point the output of each circuit has been half-wave rectified current and may not be sufficiently free of annoying ripple for some applications. Therefore, a consideration of how to attain full-wave output from a circuit embodying applicant's concept is faced. A study of the above circuits with this problem in mind led to its solution in a very practical manner. The circuit of Fig. 1 was substantially duplicated to produce the circuit of Fig. 4. The primary side of the transformers 14 and 16 (now 14' and 16') and an output lead 41 of the first circuit was connected to the output lead 39' of a second circuit to produce a series circuit out of the respective loads. It is seen that the control voltage and reference voltage transformers respectively have their secondaries duplicated but each are energized from a common primary. Since these transformers are not now identical to the individual transformers of the circuit in Fig. 1, numerals with subscripts are attached to the various elements of the added circuit. The output of this new circuit is taken from leads 39 and 41'.

The secondary sides 42 and 42' of transformer 11 are connected to the grids and cathodes of the current control devices 22, 23, 22' and 23' respectively in such a manner that the polarity of the grids 32 and 33 of the first pair of devices 22 and 23 will always be opposite to that on the grids 32' and 33' of the second pair of devices 22' and 23'. In view of the past discussion on the theory of operation of the embodiments of the invention shown in Figs. 1, 2 and 3, it can be seen that while device 22 is discharging under the assumed polarities set up in the various transformers, all other devices cannot discharge. However, when all polarity markings are changed, representative of the other half-cycle of voltage impressed on all transformers, device 23' will be the only one discharging. Hence, since the output of all the devices are in series with the external direct current power leads 39 and 41', the output will be characterized by a full-wave D. C. voltage. When the compared voltages and reference voltages are in a quadrature phase relationship, full-wave rectification will still obtain. Further discussion of this circuit seems unnecessary in the light of the previous detailed disclosure of half-wave rectification operation of all other circuits.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A phase-sensitive demodulator including a source of reversible phase alternating signal voltage and a source of like frequency but fixed phase reference voltage, a pair of electron tubes having space-discharge paths including plate and control elements therefor, said space-discharge paths being connected in push-pull arrangement and in circuit with said signal voltage source to receive voltages therefrom in phase opposition, means for connecting said control elements to said reference voltage source to receive voltages therefrom in like phase relation to control the conductivity of said tubes, and a pair of output terminals respectively connected in circuit with said plate elements.

2. A phase-sensitive demodulator of the character recited in claim 1 further comprising a pair of condensers connected between the plates, respectively, of said electron tubes and said signal voltage source, impedance means connected between the plates of said tubes and to points between said condensers and plates, and output terminals connected, respectively, to opposite ends of said impedance means.

3. A phase-sensitive demodulator including a source of reversible phase alternating signal voltage and a source of like frequency but fixed phase reference voltage, a pair of demodulating circuits each including a pair of electron tubes having anode, cathode and control electrodes, said tubes being connected in series opposition, and means for applying a potential from said signal voltage source to the anodes of said tubes in opposite phase relation, means for connecting the control electrodes of said tubes to said reference voltage source to receive voltages therefrom in like phase relation, and load impedances connected between the anodes and cathodes of said tubes and in series with each other, the load impedances of the two demodulating circuits being connected together in series, and output terminals connected to opposite ends of the series connected impedances, the signal voltages applied to the anodes of the two pairs of tubes and the reference voltages applied to the control electrodes of the two pairs of tubes being so relatively phased that but one tube may conduct on any half cycle of signal voltage and the load impedances being so interconnected as to provide full wave rectified, unidirectional voltages at said output terminals.

RAWLEY D. McCOY.

REFERENCES CITED

The following references are of record in the file of this patent:

UNITED STATES PATENTS

| Number | Name | Date |
|---|---|---|
| 1,464,322 | Kolster | Aug. 7, 1923 |
| 1,563,425 | Marbury | Dec. 1, 1925 |
| 1,615,636 | Langmuir | Jan. 25, 1927 |
| 2,183,399 | Heising | Dec. 12, 1939 |
| 2,217,477 | Gulliksen | Oct. 8, 1940 |
| 2,225,346 | La Pierre | Dec. 17, 1940 |
| 2,225,348 | Mikelson | Dec. 17, 1940 |
| 2,301,635 | Norton | Nov. 10, 1942 |
| 2,335,265 | Dodington | Nov. 30, 1943 |
| 2,338,732 | Nosker | Jan. 11, 1944 |
| 2,418,127 | Labin | Apr. 1, 1947 |
| 2,419,548 | Grieg | Apr. 29, 1947 |
| 2,434,822 | Van Buren | Jan. 20, 1948 |